United States Patent
Imai et al.

(10) Patent No.: US 10,807,566 B2
(45) Date of Patent: Oct. 20, 2020

(54) PARKING SYSTEM

(71) Applicant: HONDA MOTOR CO., LTD., Tokyo (JP)

(72) Inventors: Naoko Imai, Wako (JP); Takashi Mori, Wako (JP); Shigenori Hiruta, Wako (JP); Atsuyuki Suzuki, Wako (JP); Tomoko Shintani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/439,833

(22) Filed: Jun. 13, 2019

(65) Prior Publication Data
US 2020/0001825 A1    Jan. 2, 2020

(30) Foreign Application Priority Data
Jul. 2, 2018    (JP) .................................. 2018-125847

(51) Int. Cl.
*B60R 25/24* (2013.01)
*B60R 25/01* (2013.01)

(52) U.S. Cl.
CPC .............. *B60R 25/24* (2013.01); *B60R 25/01* (2013.01)

(58) Field of Classification Search
None
See application file for complete search history.

(56) References Cited

U.S. PATENT DOCUMENTS

| | | | | |
|---|---|---|---|---|
| 5,504,314 A | * | 4/1996 | Farmont | G07B 15/04 235/384 |
| 9,139,091 B1 | * | 9/2015 | Penilla | G06Q 20/18 |
| 10,576,969 B2 | * | 3/2020 | Penilla | G08G 1/096775 |

FOREIGN PATENT DOCUMENTS

JP    2006-225973    8/2006

* cited by examiner

*Primary Examiner* — K. Wong
(74) *Attorney, Agent, or Firm* — Rankin, Hill & Clark LLP

(57) ABSTRACT

A parking system which communicates with a communication terminal of a parking staff Ps who takes charge of deadheading vehicles between a loading space and an unloading space of vehicles and a vehicle storage space by valet parking includes a loading vehicle recognition unit which recognizes that a target vehicle for the valet parking is parked in the loading space, and an electronic key management unit which transmits an electronic key for enabling an operation of the target vehicle to the communication terminal of the parking staff when the loading vehicle recognition unit recognizes that the target vehicle is parked in the loading space.

10 Claims, 6 Drawing Sheets

| USER ID 33a | ELECTRONIC KEY ISSUANCE SITUATION 33b | LOADING PARKING POSITION 33c | STORAGE PARKING POSITION 33d | UNLOADING PARKING POSITION 33e |
|---|---|---|---|---|
| Pt-001 | DURING ISSUANCE | InPos-A | — | — |
| Pt-002 | WAIT FOR ISSUANCE | InPos-B | KpPos-B | — |
| Pt-003 | DURING ISSUANCE | InPos-C | KpPos-C | — |
| Pt-004 | WAIT FOR ISSUANCE | InPos-D | KpPos-D | OutPos-D |
| Pt-005 | WAIT FOR ISSUANCE | — | — | — |
| ⋮ | ⋮ | ⋮ | ⋮ | ⋮ |

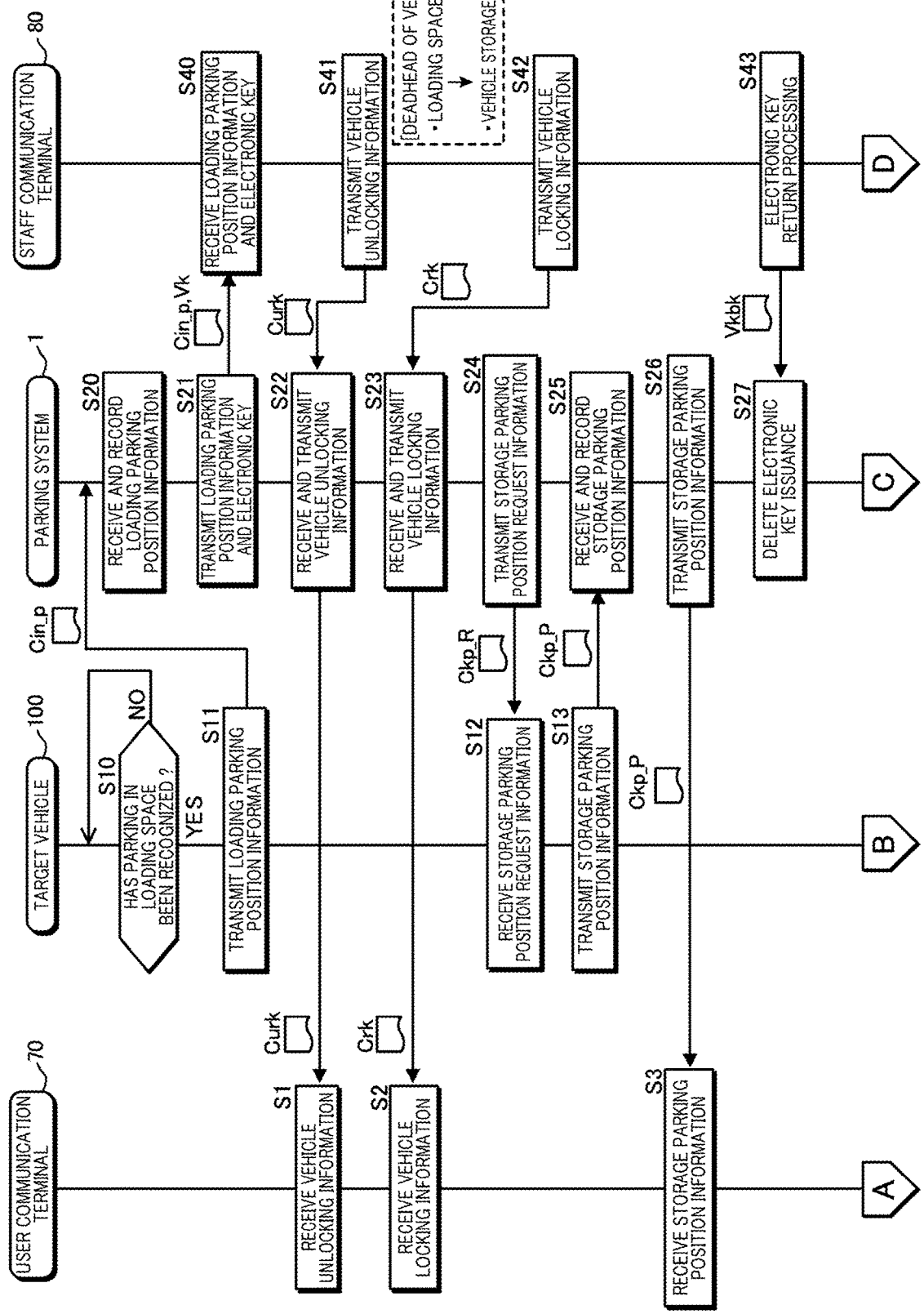

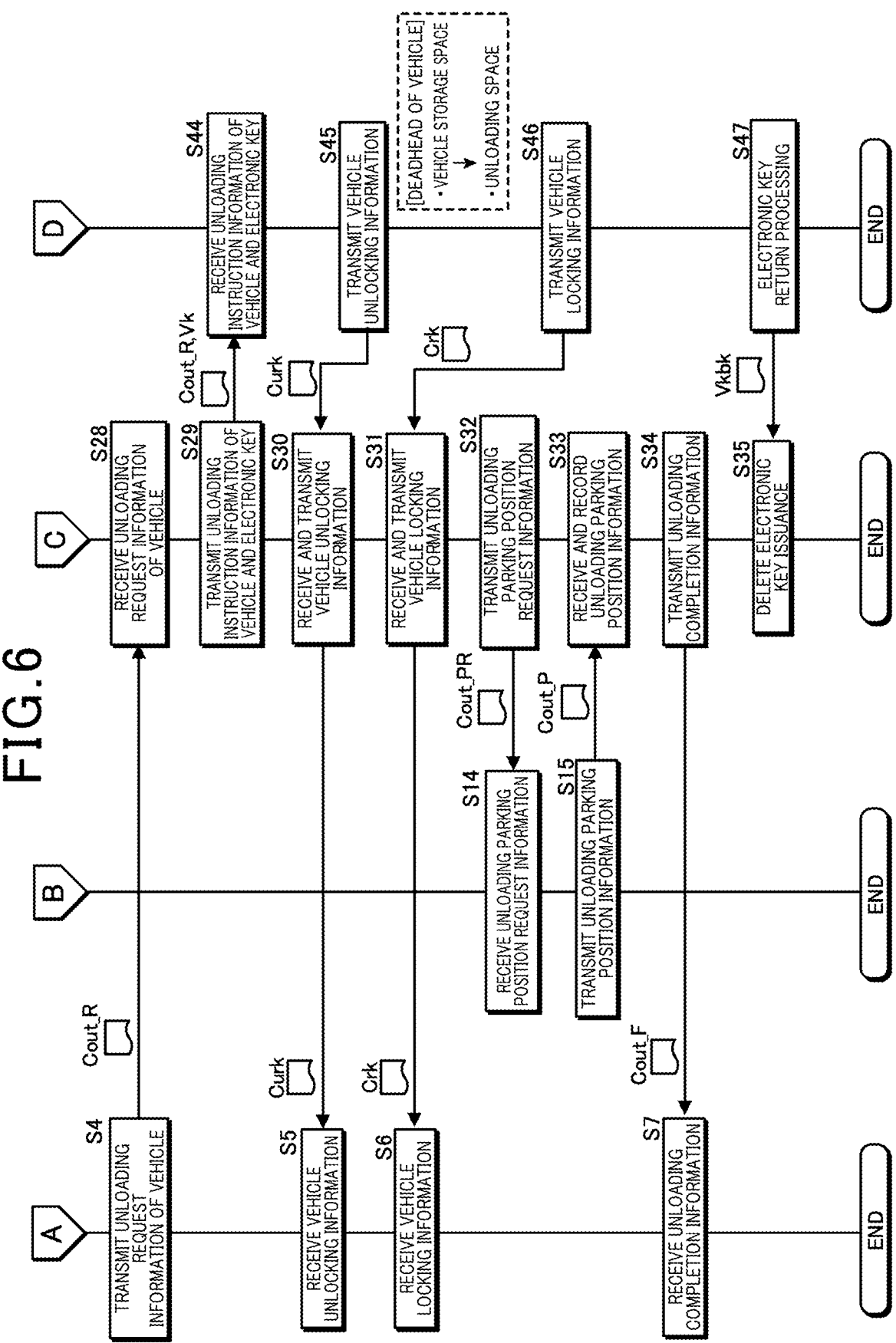

PARKING SYSTEM

INCORPORATION BY REFERENCE

The present application claims priority under 35 U.S.C. § 119 to Japanese Patent Application No. 2018-125847 filed on Jul. 2, 2018. The content of the application is incorporated herein by reference in its entirety.

BACKGROUND OF THE INVENTION

Field of the Invention

The present invention relates to a parking system.

Description of the Related Art

Conventionally, in an accommodation facility such as a hotel, for example, a valet parking service for a parking staff to drive a vehicle which a user has stopped at an entrance to a vehicle storage space and park the vehicle therein and for the parking staff to drive the vehicle which has been parked in the vehicle storage space to the entrance and deliver the vehicle to the user when the user leaves the hotel has been provided. To cope with the valet parking service, a smart keyless system adapted to enable a remote control key of a vehicle to be separated into a remote operation section and a mechanical key has been proposed in Japanese Patent Laid-Open No. 2006-225973, for example.

In the smart keyless system described in Japanese Patent Laid-Open No. 2006-225973, control to inhibit a trunk and a glove compartment from being unlocked by the separated remote operation section when the remote operation section is lent to a hotel staff to leave the vehicle with the hotel staff has been performed.

If unlocking means such as the remote operation section is handed to the hotel staff when the valet parking service is received, like in the system described in Japanese Patent Laid-Open No. 2006-225973, it disadvantageously takes time and effort when the vehicle is left with the hotel staff and when the left vehicle is picked up.

SUMMARY OF THE INVENTION

The present invention has been made in view of such a background, and is directed to providing a parking system capable of reducing user's time and effort when a valet parking service is received.

A parking system according to an aspect of the present invention is a parking system which communicates with a communication terminal of a parking staff who takes charge of deadheading vehicles between a loading space and an unloading space of vehicles and a vehicle storage space by valet parking, the parking system including a loading vehicle recognition unit which recognizes that a target vehicle for the valet parking is parked in the loading space, and an electronic key management unit which transmits an electronic key for enabling an operation of the target vehicle to the communication terminal of the parking staff when the loading vehicle recognition unit recognizes that the target vehicle is parked in the loading space.

The parking system may be configured to further include a loading parking position recognition unit which recognizes a loading parking position as a parking position of the target vehicle in the loading space, and a loading information provision unit which transmits loading parking position information representing the loading parking position recognized by the loading parking position recognition unit to the communication terminal of the parking staff.

The parking system may be configured to further include a storage parking position recognition unit which recognizes a storage parking position as a parking position of the target vehicle in the vehicle storage space when the target vehicle which is made operable with the electronic key is moved from the loading space to the vehicle storage space and is parked, and a storage information provision unit which transmits storage parking position information representing the storage parking position recognized by the storage parking position recognition unit to a communication terminal of a user of the target vehicle.

The parking system may be configured such that the electronic key management unit transmits, when it recognizes that the target vehicle is locked using the electronic key in the vehicle storage space, electronic key ineffectiveness instruction information for issuing an instruction to disable use of the electronic key by the communication terminal of the parking staff to the communication terminal of the parking staff.

The parking system may be configured such that the electronic key management unit transmits, when it receives unloading request information for requesting to unload the target vehicle from a communication terminal of a user of the target vehicle, the electronic key to the communication terminal of the parking staff.

The parking system may be configured to further include an unloading completion recognition unit which recognizes that the target vehicle is deadheaded from the vehicle storage space to the unloading space using the electronic key by transmitting the electronic key to the communication terminal of the parking staff in response to the receiving of the unloading request information, and an unloading information provision unit which transmits unloading completion information for notifying that the unloading of the target vehicle is completed to the communication terminal of the user of the target vehicle when the unloading completion recognition unit recognizes that the target vehicle is deadheaded from the vehicle storage space to the unloading space.

The parking system may be configured to further include an unloading parking position recognition unit which recognizes an unloading parking position as a parking position of the target vehicle in the unloading space, in which the unloading completion information includes information about the unloading parking position.

The parking system may be configured such that the electronic key management unit sets, when the target vehicle is made to travel using the electronic key, a function limit for setting a traveling speed to a predetermined speed or less for the electronic key.

The parking system may be configured such that the electronic key management unit sets a function limit for disabling unlocking of an accommodation section in the target vehicle for the electronic key.

In the parking system according to the aspect of the present invention, the loading vehicle recognition unit recognizes that the target vehicle has been parked in the loading space for the valet parking. When the loading vehicle recognition unit recognizes the target vehicle, the electronic key management unit transmits the electronic key for enabling the operation of the target vehicle to the communication terminal of the parking staff for the valet parking. As a result, the parking staff can operate the target vehicle using the electronic key and deadhead the target vehicle to the vehicle storage space. Accordingly, the user of the target vehicle need not hand a key of the target vehicle to the parking staff so that a time period required when the valet parking service is used can be shortened.

BRIEF DESCRIPTION OF THE DRAWINGS

FIG. 4 is an explanatory diagram of a parking position table;

FIG. 5 is a first flowchart of the valet parking service using the parking system; and FIG. 6 is a second flowchart of the valet parking service using the parking system.

DETAILED DESCRIPTION OF THE PREFERRED EMBODIMENTS

[1. Deadhead Service of Vehicles by Valet Parking]

Figure 1:
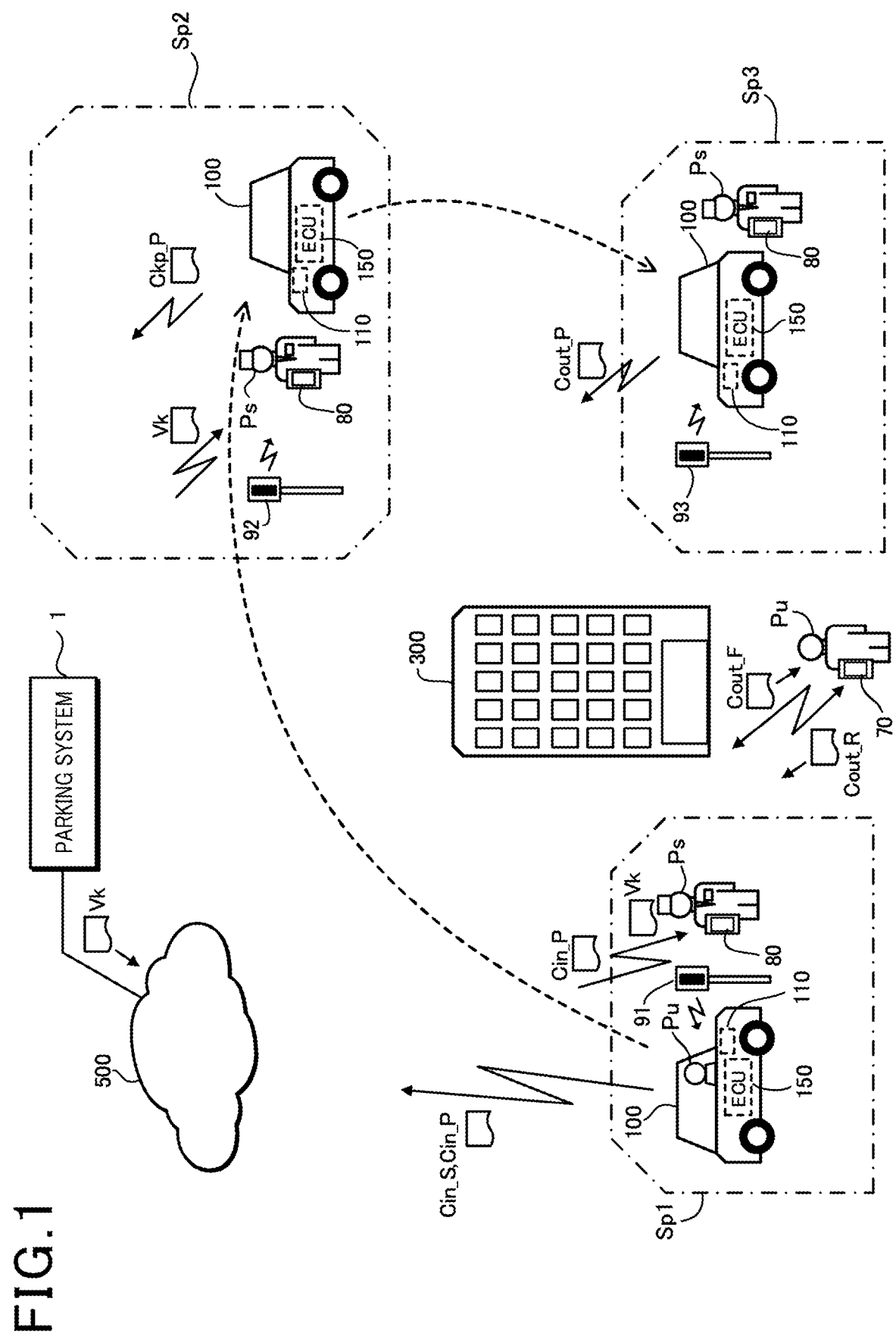
FIG. 1 is an explanatory diagram of a valet parking service using a parking system.

FIG. 1 is an explanatory diagram of a valet parking service using a parking system 1 according to the present embodiment. FIG. 1 illustrates an embodiment in which a deadhead service of a target vehicle 100 is provided between a loading space Sp1 and an unloading space Sp3 of vehicles and a vehicle storage space Sp2 in an accommodation facility 300.

The parking system 1 communicates with a communication terminal 70 of a user Pu of the target vehicle 100 who requests the valet parking service (hereinafter referred to as a user communication terminal 70) and an ECU (electronic control unit) 150 loaded into the target vehicle 100 via a communication network 500. Further, the parking system 1 communicates with a communication terminal 80 of a parking staff Ps who takes charge of deadheading vehicles by valet parking (hereinafter referred to as a staff communication terminal 80) via the communication network 500.

A loading beacon 91 which outputs an identification signal of the loading space Sp1 is installed in the loading space Sp1. The ECU 150 in the target vehicle 100 recognizes that the target vehicle 100 has been parked in the loading space Sp1 by receiving the identification signal outputted from the loading beacon 91. The ECU 150 may recognize that the target vehicle 100 has been parked in the loading space Sp1 when a navigation unit 110 loaded into the target vehicle 100 detects a current position of the target vehicle 100. The ECU 150 transmits to the parking system 1 loading recognition information Cin_S indicating that the target vehicle 100 has been parked in the loading space Sp1 and loading parking position information Cin_P representing a parking position of the target vehicle 100 in the loading space Sp1.

The parking system 1 transmits, when it recognizes that the target vehicle 100 has been parked in the loading space Sp1 by receiving the loading recognition information Cin_S and the loading parking position information Cin_P, an electronic key (virtual key) Vk for enabling an operation of the target vehicle 100 to the staff communication terminal 80. The parking system 1 transmits the loading parking position information Cin_P to the staff communication terminal 80.

The parking staff Ps refers to the loading parking position information Cin_P received by the staff communication terminal 80, to come to the parking position of the target vehicle 100 and unlock the target vehicle 100 using the electronic key Vk received by the staff communication terminal 80. The parking staff Ps drives the target vehicle 100, to deadhead the target vehicle 100 from the loading space Sp1 to the vehicle storage space Sp2.

The ECU 150 in the target vehicle 100 communicates with the staff communication terminal 80 to recognize the electronic key Vk using a communication unit (not illustrated) loaded into the target vehicle 100, and brings the target vehicle 100 into an operable state. Communication between the target vehicle 100 and the staff communication terminal 80 is performed by BR/EDR (Bluetooth Basic Rate/Enhanced Data Rate; Bluetooth is registered trademark), BLE (Bluetooth Low Energy), Wi-Fi (registered trademark), NFC (Near Field Communication), and the like.

A vehicle storage beacon 92 which outputs an identification signal of the vehicle storage space Sp2 is installed in the vehicle storage space Sp2. The ECU 150 in the target vehicle 100 recognizes that the target vehicle 100 has been parked in the vehicle storage space Sp2 by receiving the identification signal outputted from the vehicle storage beacon 92. The ECU 150 may recognize that the target vehicle 100 has been moved to the vehicle storage space Sp2 and parked therein when the navigation unit 110 loaded into the target vehicle 100 detects a current position of the target vehicle 100. The ECU 150 transmits to the parking system 1 storage parking position information Ckp_P representing a parking position of the target vehicle 100 in the vehicle storage space Sp2.

The user Pu of the target vehicle 100 transmits, when he or she desires to deadhead the target vehicle 100 to the unloading space Sp3, unloading request information Cout_R from the user communication terminal 70 to the parking system 1. The parking system 1, which has received the unloading request information Cout_R, transmits to the staff communication terminal 80 the electronic key Vk of the target vehicle 100 and the storage parking position information Ckp_P.

The parking staff Ps refers to the storage parking position information Ckp_P received by the staff communication terminal 80, to come to the parking position of the target vehicle 100 and unlock the target vehicle 100 using the electronic key Vk received by the staff communication terminal 80. The parking staff Ps drives the target vehicle 100, to deadhead the target vehicle 100 from the vehicle storage space Sp2 to the unloading space Sp3.

An unloading beacon 93 which outputs an identification signal of the unloading space Sp3 is installed in the unloading space Sp3. The ECU 150 in the target vehicle 100 recognizes that the target vehicle 100 has been parked in the unloading space Sp3 by receiving the identification signal outputted from the unloading beacon 93. The ECU 150 may recognize that the target vehicle 100 has been parked in the unloading space Sp3 when the navigation unit 110 loaded into the target vehicle 100 detects a current position of the target vehicle 100. The ECU 150 transmits to the parking system 1 unloading parking position information Cout_P representing a parking position of the target vehicle 100 in the unloading space Sp3.

The parking system 1, which has received the unloading parking position information Cout_P, transmits to the user communication terminal 70 unloading completion information Cout_F for notifying completion of unloading and the parking position in the unloading space Sp3. The user Pu of the target vehicle 100 refers to the unloading completion information Cout_F received by the user communication terminal 70, to come to the parking position of the target vehicle 100 and pick up the target vehicle 100.

As described above, through the valet parking service provided by the parking system 1, the user Pu of the target vehicle 100 can request to deadhead the target vehicle 100 from the loading space Sp1 to the vehicle storage space Sp2 without handing a physical key to the parking staff Ps. The user Pu can easily request to deadhead the target vehicle 100 from the vehicle storage space Sp2 to the unloading space Sp3 by transmitting the unloading request information Cout_R for requesting to unload the target vehicle 100 to the parking system 1 with an electronic mail or the like.

[2. Configuration of Parking System]

Then, a configuration of the parking system 1 will be described with reference to FIG. 2. The parking system 1 is a computer system including a CPU (central processing unit) 10, a memory 30, a communication unit 40, and the like. The CPU 10 functions as a user information management unit 11, an electronic key management unit 12, a loading vehicle recognition unit 13, a loading parking position recognition unit 14, a loading information provision unit 15, a storage parking position recognition unit 16, a storage information provision unit 17, an unloading completion recognition unit 18, an unloading parking position recognition unit 19, and an unloading information provision unit 20 by reading and executing a control program 31 for the parking system 1 stored in the memory 30.

The user information management unit 11 is responsive to an application from a user who desires the valet parking service by the parking system 1 to register and manage the user. The user information management unit 11 records, for each of users, information about a vehicle to be used (a vehicle ID (identification), a vehicle type, a color, etc.) and an electronic key for enabling an operation of the vehicle in association with each other in a user registration table 32 stored in the memory 30.

The parking system 1 communicates with the target vehicle 100 using the vehicle ID. The parking staff Ps is an employee of the accommodation facility 300, and information about the staff communication terminal 80 used by the parking staff Ps is registered in the parking system 1. Accordingly, the parking system 1 can communicate with the staff communication terminal 80.

Figure 3:
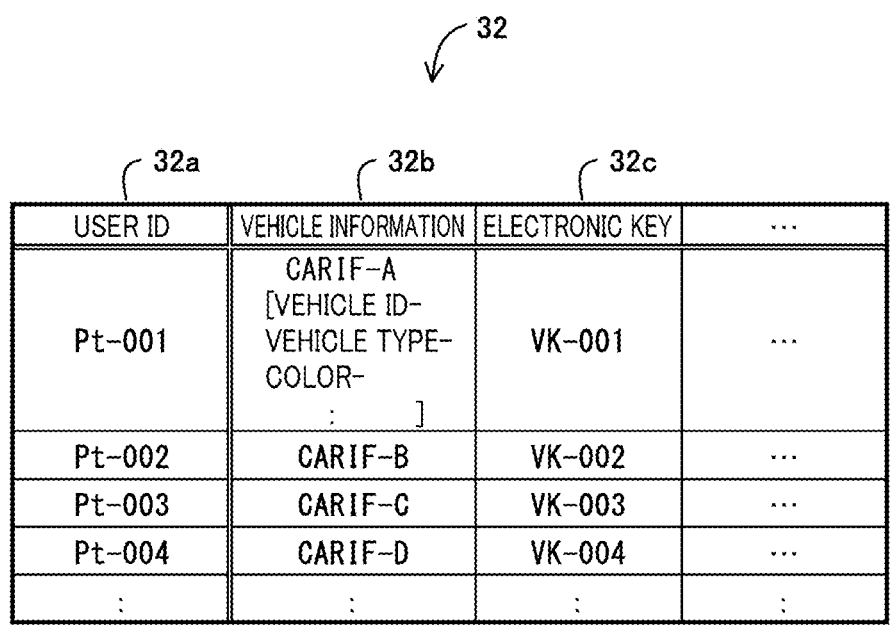
FIG. 3 is an explanatory diagram of a user registration table.

As illustrated in FIG. 3, for each of users, a user ID 32a, vehicle information 32b, and an electronic key 32c are recorded in the user registration table 32. For a user ID Pt-001, for example, vehicle information CARIF-A and an electronic key VK-001 are recorded in association with each other. Information about the user communication terminal 70 used by the user Pu is also recorded in the user registration table 32, and the parking system 1 communicates with the user communication terminal 70 using the information.

The electronic key management unit 12 manages use of the electronic key of each of the users recorded in the user registration table 32. In the present embodiment, the electronic key management unit 12 transmits the electronic key to the staff communication terminal 80, to enable an operation of the target vehicle 100 by the parking staff Ps. The electronic key management unit 12 receives unlocking information Curk and locking information Crk of the target vehicle 100 with the electronic key Vk transmitted from the staff communication terminal 80. The electronic key management unit 12 transmits the unlocking information Curk and the locking information Crk to the user communication terminal 70, to notify the user Pu that the target vehicle 100 has been unlocked and locked.

The loading vehicle recognition unit 13 receives the loading recognition information Cin_S transmitted from the target vehicle 100, to recognize that the target vehicle 100 has been parked in the loading space Sp1 (see FIG. 1). The loading vehicle recognition unit 13 may be configured to recognize that the target vehicle 100 has been parked in the loading space Sp1 by receiving information for requesting to deadhead the target vehicle 100 from the user communication terminal 70 of the user Pu who has parked the target vehicle 100 in the loading space Sp1.

The loading parking position recognition unit 14 recognizes the parking position of the target vehicle 100 in the loading space Sp1 by receiving the loading parking position information Cin_P transmitted from the target vehicle 100. The loading parking position recognition unit 14 records information about the parking position of the target vehicle 100 in a parking position table 33 stored in the memory 30.

As illustrated in FIG. 4, for each of users, a user ID 33a, a situation where the electronic key Vk is issued ("during issuance" or "wait for issuance") 33b, a parking position (loading parking position) 33c of the target vehicle 100 in the loading space Sp1, a parking position (storage parking position) 33d of the target vehicle 100 in the vehicle storage space Sp2 (see FIG. 1), and a parking position 33e of the target vehicle 100 in the unloading space Sp3 (see FIG. 1) are recorded in association with one another in the parking position table 33. For a user ID Pt-001, for example, the electronic key Vk is being issued, and a loading parking position InPos-A is recorded. Accordingly, it can be found that the target vehicle 100 is being deadheaded from the loading space Sp1 to the vehicle storage space Sp2.

For a user ID PT-004, issuance of the electronic key Vk is waited for, and all a loading parking position InPos-D, a storage parking position KpPos-D, and an unloading parking position OutPos-D are recorded. Accordingly, it can be found that the target vehicle 100 has been unloaded from the vehicle storage space Sp2 so that processing for returning the electronic key Vk has been performed.

The loading information provision unit 15 transmits the loading parking position information Cin_P to the staff communication terminal 80 of the parking staff Ps. The storage parking position recognition unit 16 recognizes the parking position of the target vehicle 100 in the vehicle storage space Sp2 by receiving the storage parking position information Ckp_P transmitted from the target vehicle 100. The storage parking position recognition unit 16 records the information about the parking position of the target vehicle 100 in the parking position table 33 stored in the memory 30. The storage information provision unit 17 transmits the storage parking position information Ckp_P to the staff communication terminal 80 of the parking staff Ps.

The unloading completion recognition unit 18 recognizes that the target vehicle 100 has been deadheaded from the vehicle storage space Sp2 to the unloading space Sp3, thereby completing the unloading of the target vehicle 100, by receiving the unloading parking position information Cout_P transmitted from the target vehicle 100. The unloading parking position recognition unit 19 recognizes the parking position of the target vehicle 100 in the unloading space Sp3 from the unloading parking position information Cout_P. The unloading parking position recognition unit 19 records the information about the parking position of the target vehicle 100 in the parking position table 33 stored in the memory 30.

The unloading position provision unit 20 transmits to the user communication terminal 70 the unloading completion information Cout_F for notifying the completion of the unloading of the target vehicle 100 into the unloading space Sp3 and the parking position of the target vehicle 100 in the unloading space Sp3.

[3. Processing for Valet Parking Service]

Then, in a service form of the valet parking service illustrated in FIG. 1, a series of processing performed by the parking system 1, the target vehicle 100, the user communication terminal 70, and the staff communication terminal 80 will be described with reference to respective flowcharts illustrated in FIGS. 5 and 6.

In step S10 illustrated in FIG. 5, the ECU 150 in the target vehicle 100 determines whether or not the target vehicle 100 has been parked in the loading space Sp1 from a situation where the identification signal from the loading beacon 91 is received or the current position of the target vehicle 100 is detected by the navigation unit 110 loaded into the target vehicle 100. If the ECU 150 recognizes that the target vehicle 100 has been parked in the loading space Sp1, the processing proceeds to step S11. In step S11, the ECU 150 transmits, when the navigation unit 110 detects the parking position of the target vehicle 100 in the loading space Sp1, the loading parking position information Cin_P representing the parking position to the parking system 1.

The user Pu who has parked the target vehicle 100 in the loading space Sp1 can also transmit the loading parking position information Cin_P representing the parking position of the target vehicle 100 from the user communication terminal 70 to the parking system 1 by operating the user communication terminal 70. In this case, a position detection sensor such as a GPS (global positioning system) sensor provided in the user communication terminal 70 detects the parking position of the target vehicle 100.

In the parking system 1, in step S20, the loading vehicle recognition unit 13 recognizes that the target vehicle 100 has been parked in the loading space Sp1 by receiving the loading parking position information Cin_P, and the loading parking position recognition unit 14 recognizes the parking position of the target vehicle 100 in the loading space Sp1 from the loading parking position information Cin_P and records the recognized parking position in the parking position table 33. In subsequent step S21, the loading information provision unit 15 transmits the loading parking position information Cin_P to the staff communication terminal 80. The electronic key management unit 12 transmits the electronic key Vk of the user Pu recorded in the user registration table 32 to the staff communication terminal 80, and records a situation where the electronic key Vk is being issued in the parking position table 33.

In step S40, the staff communication terminal 80 receives the loading parking position information Cin_P and the electronic key Vk from the parking system 1. The parking staff Ps confirms the loading parking position information Cin_P, to come to the parking position of the target vehicle 100 and unlock the target vehicle 100 using the electronic key Vk. In subsequent step S41, the staff communication terminal 80 transmits to the parking system 1 the vehicle unlocking information Curk indicating that the target vehicle 100 has been unlocked with the electronic key Vk.

In step S22, the electronic key management unit 12 in the parking system 1 transmits, when it has received the vehicle unlocking information Curk from the staff communication terminal 80, the vehicle unlocking information Curk to the user communication terminal 70.

The parking staff Ps drives the target vehicle 100, to deadhead the target vehicle 100 from the loading space Sp1 to the vehicle storage space Sp2, park the target vehicle 100 in the vehicle storage space Sp2, and lock the target vehicle 100 with the electronic key Vk. In step S42, the staff communication terminal 80 transmits to the parking system 1 the vehicle locking information Crk for notifying that the target vehicle 100 has been locked.

In step S23, the electronic key management unit 12 transmits, when it has received the vehicle locking information CrK, the vehicle locking information Crk to the user communication terminal 70. In subsequent step S24, the storage parking position recognition unit 16 transmits to the target vehicle 100 the storage parking position request information Ckp_R for requesting to provide the parking position in the vehicle storage space Sp2 of the target vehicle 100.

In the target vehicle 100, when the ECU 150 receives the storage parking position request information Ckp_R in step S12, the navigation unit 110 detects the parking position of the target vehicle 100 in the vehicle storage space Sp2. In subsequent step S13, the ECU 150 transmits to the parking system 1 the storage parking position information Ckp_P representing the parking position of the target vehicle 100 in the vehicle storage space Sp2.

In the parking system 1, in step S25, the storage parking position recognition unit 16 recognizes the parking position of the target vehicle 100 in the vehicle storage space Sp2 from the storage parking position information Ckp_P received from the target vehicle 100, and records information about the parking position in the parking position table 33. In subsequent step S26, the storage information provision unit 17 transmits the storage parking position information Ckp_P to the user communication terminal 70.

In step S3, the user communication terminal 70 receives the storage parking position information Ckp_P from the parking system 1. The user Pu can recognize the parking position of the target vehicle 100 in the vehicle storage space Sp2 when the user communication terminal 70 confirms the storage parking position information Ckp_P.

The parking staff Ps who has parked the target vehicle 100 in the vehicle storage space Sp2 and has locked the target vehicle 100 with the electronic key Vk operates the staff communication terminal 80, to perform electronic key return processing in step S43. Through the electronic key return processing, the electronic key Vk stored in a memory of the staff communication terminal 80 is deleted. The staff communication terminal 80 transmits to the parking system 1 electronic key return information Vkbk for notifying that the electronic key Vk has been deleted.

In the parking system 1, the electronic key management unit 12 sets, when it has received the electronic key return information Vkbk in step S27, a record of the situation where the electronic key Vk of the target vehicle 100 is issued in the parking position table 33 to "wait for issuance".

In step S4 illustrated in FIG. 6, the user communication terminal 70 transmits, when the user Pu operates the user communication terminal 70 to request to deadhead the target vehicle 100 from the vehicle storage space Sp2 to the unloading space Sp3, the unloading request information Cout_R to the parking system 1. In the parking system 1, the electronic key management unit 12 sets, when it receives the unloading request information Cout_R in step S28, the record of the situation where the electronic key Vk is issued in the parking position table 33 to "during issuance", and transmits the unloading instruction information Cout_R for issuing an instruction to unload the target vehicle 100 and the electronic key Vk to the staff communication terminal 80 in step S29.

The staff communication terminal 80 receives the unloading instruction information Cout_R and the electronic key Vk in step S44, and transmits, when the parking staff Ps has unlocked the target vehicle 100 with the electronic key Vk in the vehicle storage space Sp2, the vehicle unlocking information Curk for notifying that the target vehicle 100 has been unlocked with the electronic key Vk to the parking system 1 in step S45. In the parking system 1, in step S30, the electronic key management unit 12 transmits, when it receives the vehicle unlocking information Curk, the vehicle unlocking information Curk to the user communication terminal 70. The user Pu can recognize that the target vehicle 100 has been unlocked with the electronic key Vk by confirming the vehicle unlocking information Curk received by the user communication terminal 70 in step S5.

The parking staff Ps drives the target vehicle 100 which is made operable with the electronic key Vk, to deadhead the target vehicle 100 from the vehicle storage space Sp2 to the unloading space Sp3. The parking staff Ps parks the target vehicle 100 in the unlocking space Sp3, and locks the target vehicle 100 with the electronic key Vk. In step S46, the staff communication terminal 80 transmits, when the target vehicle 100 has been locked, the vehicle locking information Crk to the parking system 1. In subsequent step S47, the staff communication terminal 80 performs electronic key return processing, to delete the electronic key Vk stored in the memory while transmitting the electronic key return information Vkbk to the parking system 1.

In the parking system 1, in step S31, the unloading completion recognition unit 18 recognizes, when the vehicle locking information Crk is received, that the target vehicle 100 has been deadheaded from the vehicle storage space Sp2 to the unloading space Sp3, thereby completing the unloading of the target vehicle 100. The electronic key management unit 12 transmits the vehicle unlocking information Crk to the user communication terminal 70. The user Pu can recognize that the target vehicle 100 has been unlocked with the electronic key Vk by confirming the vehicle locking information Crk received by the user communication terminal 70 in step S6.

In step S32, the unloading parking position recognition unit 19 transmits to the target vehicle 100 unloading parking position request information Cout_PR for requesting to notify the parking position of the target vehicle 100 in the unloading space Sp3. In the target vehicle 100, the ECU 150, which has received the unloading parking position request information Cout_PR in step S14, recognizes the parking position of the target vehicle 100 in the unloading space Sp3 based on a detection signal of the navigation unit 110.

In subsequent step S15, the unloading parking position recognition unit 19 transmits to the parking system 1 the unloading parking position information Cout_P representing the parking position of the target vehicle 100 in the unloading space Sp3. In the parking system 1 which has received the unloading parking position information Cout_P, the unloading parking position recognition unit 19 recognizes the parking position of the target vehicle 100 in the unloading space Sp3, and records the unloading parking position information Cout_P in the parking position table 33 in step S33.

In subsequent step S34, the unloading information provision unit 20 transmits to the user communication terminal 70 the unloading completion information Cout_F for notifying the completion of the unloading of the target vehicle 100 and the parking position of the target vehicle 100. The user Pu can recognize the completion of the unloading of the target vehicle 100 and the parking position of the target vehicle 100 by confirming the unloading completion information Cout_F received by the user communication terminal 70 in step S7. In this case, the user Pu can come and pick up the target vehicle 100 after the unloading of the target vehicle 100 has been completed. Accordingly, the user Pu need not wait until the target vehicle 100 is deadheaded in the unloading space Sp3.

The electronic key management unit 12 waits for the record of the situation where the electronic key Vk is issued in the parking position table 33 to "wait for issuance" upon receiving the electronic key return information Vkbk in step S35.

[4. Other Embodiments]

In the above-described embodiment, the parking system 1 is configured to delete the electronic key Vk from the staff communication terminal 80 when the deadhead of the target vehicle 100 from the loading space Sp1 to the vehicle storage space Sp2 has been completed and transmit the electronic key Vk to the staff communication terminal 80 again when the deadhead from the vehicle storage space Sp2 to the unloading space Sp3 is requested. As another configuration, the parking system 1 may be configured not to delete the electronic key Vk from the staff communication terminal 80 in a stage where the deadhead of the target vehicle 100 from the loading space Sp1 to the vehicle storage space Sp2 has been completed. In this case, in a period elapsed until the target vehicle 100 is unloaded into the unloading space Sp3 since the target vehicle 100 was loaded into the loading space Sp1, the electronic key Vk remains stored in the staff communication terminal 80.

In the above-described embodiment, the staff communication terminal 80 which has transmitted the vehicle locking information Crk to the parking system 1 has performed the processing for deleting the electronic key Vk from the memory in step S43 illustrated in FIG. 5. As another configuration, the parking system 1 which has received the vehicle locking information Crk from the staff communication terminal 80 in step S23 may be configured such that the electronic key management unit 12 transmits to the staff communication terminal 80 electronic key ineffectiveness instruction information for issuing an instruction to disable use of the electronic key Vk and the staff communication terminal 80 which has received the electronic key ineffectiveness instruction information deletes the electronic key Vk from the memory.

The parking system 1 may be configured to request, within a predetermined time period (e.g., five minutes) elapsed since the staff communication terminal 80 performed the processing for deleting the electronic key Vk from the memory in step S43, to retransmit the electronic key Vk from the staff communication terminal 80 to the parking system 1, to enable the electronic key Vk to be acquired again.

The parking system 1 may be configured to transmit, when the user Pu temporarily returns to the target vehicle 100 to unlock the target vehicle 100 after the target vehicle 100 has been parked in the vehicle storage space Sp2, information for transmitting the unlocking of the target vehicle 100 and a time period in which the target vehicle 100 has been unlocked to the parking system 1 or the staff communication terminal 80. In providing the valet parking service, a service provider side such as a hotel accepts responsibility for maintaining a state of the target vehicle 100 such that the kept target vehicle 100 is neither damaged nor significantly dirty. When the user Pu has unlocked the target vehicle 100, the target vehicle 100 may be damaged or dirty due to an action of the user Pu. Therefore, it becomes possible to clarify where responsibility lies for a damage or a dirt which has occurred in the target vehicle 100 using the unlocking of the target vehicle 100 and information about the time period in which the target vehicle 100 has been unlocked. A person other than the user Pu can conceivably unlock the target vehicle 100 for the purpose of stealing the target vehicle 100 using a key of the user Pu. Accordingly, the parking staff Ps who has been informed of unlocking can prevent the target vehicle 100 or an object within the target vehicle 100 from being stolen by confirming a situation of the target vehicle 100.

The parking system 1 may be configured to transmit, when the user Pu has parked the target vehicle 100 in the loading space Sp1, loading parking position information, transmission/return information of the electronic key Vk, and the like from the parking system 1 to not only the staff communication terminal 80 of the parking staff Ps but also a communication terminal installed in a waiting room of parking staff Ps (a room where a plurality of parking staffs Ps are waiting), for example, to make a notification such as "A guest comes" by display on an electric bulletin board connected to the communication terminal or voice output from a speaker or display a list of situations where electronic keys Vk are kept/returned.

The configuration is particularly effective when the plurality of parking staffs Ps exist. The plurality of parking staffs Ps can plainly confirm the situations where the electronic keys Vk are kept/returned on the electric bulletin board and easily manage the electronic keys Vk.

A function limit may be set for the electronic key Vk transmitted from the parking system 1 to the staff communication terminal 80. For example, unlocking of an accommodation section (a trunk, a glove compartment, etc.) in the target vehicle 100 with the electronic key Vk may be disabled. When a driving operation of the target vehicle 100 is enabled with the electronic key Vk, a traveling speed of the target vehicle 100 may be limited to a predetermined speed or less.

Figure 2:
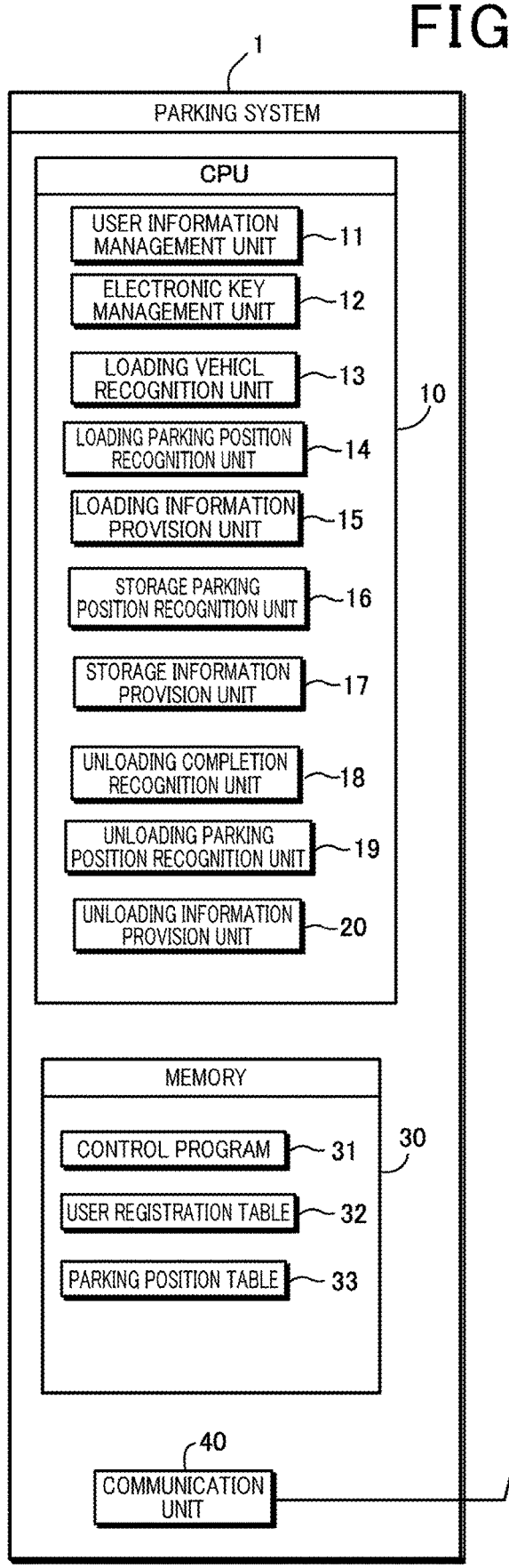
FIG. 2 is a configuration diagram of the parking system.
Figure 2:
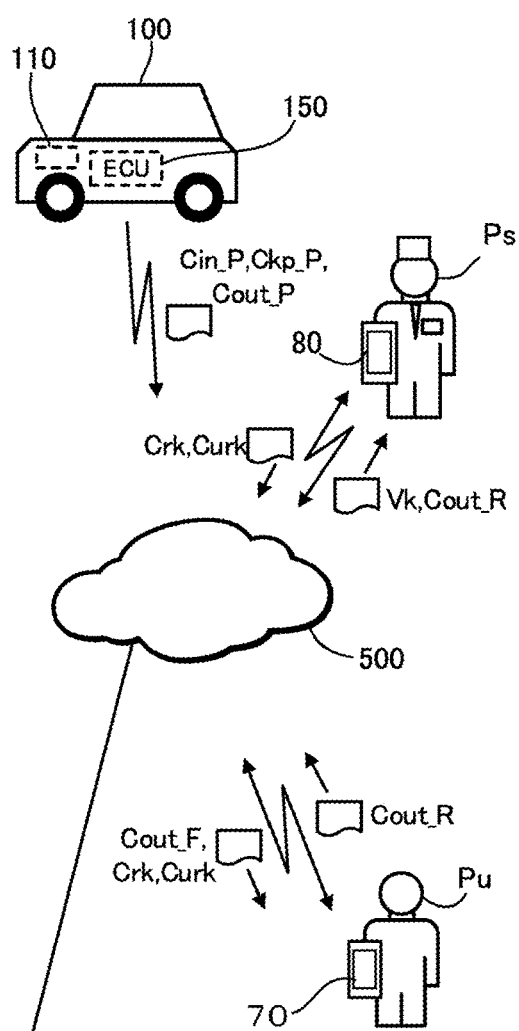

FIG. 2 is a schematic view illustrating a functional configuration of the parking system 1 with the functional configuration sectionalized depending on main processing contents to facilitate understanding of the present invention. The parking system 1 may be configured by another sectionalization. Processing of each of components may be performed by one hardware unit, or may be performed by a plurality of hardware units. Processing of each of the components illustrated in FIGS. 5 and 6 may be performed by one program, or may be performed by a plurality of programs.

Reference Signs List

1 . . . Parking system, 10 . . . CPU, 11 . . . User information management unit, 12 . . . Electronic key management unit, 13 . . . Loading vehicle recognition unit, 14 . . . Loading parking position recognition unit, 15 . . . Loading information recognition unit, 16 . . . Storage parking position recognition unit, 17 . . . Storage information provision unit, 18 . . . Unloading completion recognition unit, 19 . . . Unloading parking position recognition unit, 20 . . . Unloading information provision unit, 30 . . . Memory, 31 . . . Control program, 32 . . . User registration table, 33 . . . Parking position table, 40 . . . Communication unit, 70 . . . User communication terminal, 80 . . . Staff communication terminal, 91 . . . Loading beacon, 92 . . . Vehicle storage beacon, 93 . . . Unloading beacon, 100 . . . Target vehicle, 110 . . . Navigation unit, 150 . . . ECU, 300 . . . Accommodation facility, 500 . . . Communication network, Pu . . . User of target vehicle 100, and Ps . . . Parking staff.

What is claimed is:

1. A parking system which communicates with a communication terminal of a parking staff who takes charge of deadheading vehicles between a loading space and an unloading space of vehicles and a vehicle storage space by valet parking, the parking system comprising:

a central processing unit (CPU) and a memory, wherein the CPU comprises:

a user information management unit that records information about a target vehicle to be used for the valet parking and an electronic key for enabling an operation of the target vehicle in association with each other in the memory;

a loading vehicle recognition unit which recognizes that the target vehicle is parked in the loading space by receiving a loading recognition information representing that the target vehicle has been parked in the loading space and a loading parking position information representing a parking position of the target vehicle in the loading space;

an electronic key management unit which transmits the electronic key that is recorded in the memory in association with information about the target vehicle to the communication terminal of the parking staff when the loading vehicle recognition unit recognizes that the target vehicle is parked in the loading space; and a loading information provision unit that transmits the loading parking position information to the communication terminal of the parking staff when the loading vehicle recognition unit recognizes that the target vehicle is parked in the loading space.

2. The parking system according to claim 1, wherein the CPU further comprises:

a storage parking position recognition unit which recognizes a storage parking position as a parking position of the target vehicle in the vehicle storage space when the target vehicle which is made operable with the electronic key is moved from the loading space to the vehicle storage space and parked; and a storage information provision unit which transmits storage parking position information representing the storage parking position recognized by the storage parking position recognition unit to a communication terminal of a user of the target vehicle.

3. The parking system according to claim 1, wherein the electronic key management unit transmits, when it recognizes that the target vehicle is locked using the electronic key in the vehicle storage space, electronic key ineffectiveness instruction information for issuing an instruction to disable use of the electronic key by the communication terminal of the parking staff to the communication terminal of the parking staff.

4. The parking system according to claim 1, wherein the electronic key management unit transmits, when it receives unloading request information for requesting to unload the target vehicle from a communication terminal of a user of the target vehicle, the electronic key to the communication terminal of the parking staff.

5. The parking system according to claim 4, wherein the CPU further comprises:

an unloading completion recognition unit which recognizes that the target vehicle is deadheaded from the vehicle storage space to the unloading space using the electronic key by transmitting the electronic key to the communication terminal of the parking staff in response to the receiving of the unloading request information; and an unloading information provision unit which transmits unloading completion information for notifying that the unloading of the target vehicle is completed to the communication terminal of the user of the target vehicle when the unloading completion recognition unit recognizes that the target vehicle is deadheaded from the vehicle storage space to the unloading space.

6. The parking system according to claim 5, wherein the CPU further comprises an unloading parking position recognition unit which recognizes an unloading parking position as a parking position of the target vehicle in the unloading space, wherein the unloading completion information includes information about the unloading parking position.

7. The parking system according to claim 1, wherein the electronic key management unit sets, when the target vehicle is made to travel using the electronic key, a function limit for setting a traveling speed to a predetermined speed or less for the electronic key.

8. The parking system according to claim 1, wherein the electronic key management unit sets a function limit for disabling unlocking of an accommodation section in the target vehicle for the electronic key.

9. The parking system according to claim 2, wherein when the target vehicle is moved from the loading space to the vehicle storage space and is parked the storage information provision unit transmits the storage parking position information recognized by the storage parking position recognition unit to the communication terminal of the user that is recorded in the memory in association with information about the target vehicle.

10. The parking system according to claim 5, wherein when the unloading completion recognition unit recognizes that the target vehicle is deadheaded from the vehicle storage space to the unloading space the unloading information provision unit transmits the storage parking position information recognized by the unloading completion recognition unit to the communication terminal of the user that is recorded in the memory in association with information about the target vehicle.

* * * * *